(12) United States Patent
Abuelsaad et al.

(10) Patent No.: US 10,453,104 B2
(45) Date of Patent: Oct. 22, 2019

(54) PRICING DATA ACCORDING TO CONTRIBUTION IN A QUERY

(71) Applicant: International Business Machines Corporation, Armonk, NY (US)

(72) Inventors: Tamer E. Abuelsaad, Somers, NY (US); Gregory J. Boss, Saginaw, MI (US); John M. Ganci, Jr., Cary, NC (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1060 days.

(21) Appl. No.: 14/153,258

(22) Filed: Jan. 13, 2014

(65) Prior Publication Data

US 2015/0199734 A1 Jul. 16, 2015

(51) Int. Cl.
*G06Q 20/12* (2012.01)
*G06Q 30/02* (2012.01)

(52) U.S. Cl.
CPC .............................. *G06Q 30/0283* (2013.01)

(58) Field of Classification Search
CPC .................................................... G06Q 20/123
USPC ................... 705/7.11, 1.1, 26.61, 400, 7.35
See application file for complete search history.

(56) References Cited

U.S. PATENT DOCUMENTS

| | | | |
|---|---|---|---|
| 6,970,874 B2 | 11/2005 | Egilsson et al. | |
| 7,454,410 B2 | 11/2008 | Squillante et al. | |
| 7,814,042 B2* | 10/2010 | Ahmed | G06F 17/3097 707/719 |
| 8,285,703 B1 | 10/2012 | Wagers | |
| 8,381,120 B2 | 2/2013 | Stibel et al. | |
| 2011/0184847 A1* | 7/2011 | Axilrod | G06Q 20/102 705/37 |
| 2012/0316993 A1* | 12/2012 | Smith | G06Q 20/085 705/26.43 |

(Continued)

FOREIGN PATENT DOCUMENTS

| | | |
|---|---|---|
| WO | 0002141 A1 | 1/2000 |
| WO | 2008008213 A2 | 1/2008 |

OTHER PUBLICATIONS

C. Ballard et al., "Enabling Robust Business Analytics with InfoSphere Warehouse Cubing Services", IBM Corporation, 2009, pp. 1-34.

(Continued)

*Primary Examiner* — Akiba K Allen
(74) *Attorney, Agent, or Firm* — Garg Law Firm, PLLC; Rakesh Garg; James Nock

(57) ABSTRACT

A method, system, and computer program product for pricing data according to contribution in a query are provided in the illustrative embodiments. A set of data cubes is identified, wherein a data cube in the set of data cubes comprises a quantum of data configured for trading in exchange for a payment, the set of data cubes being usable for answering a query. A first portion of a price for performing the query is computed, wherein the first portion corresponds to a first number of records used from a first data cube by the query, the first data cube being included in the set of data cubes. The first portion and the first number of records are presented in a pricing preview of the query.

15 Claims, 7 Drawing Sheets

(56) References Cited

U.S. PATENT DOCUMENTS

2013/0097664 A1* 4/2013 Herz .................... G06Q 10/10
                                                  726/1
2013/0238387 A1  9/2013 Stibel et al.
2013/0246336 A1  9/2013 Ahuja et al.
2013/0275222 A1* 10/2013 Amaro ................ G06Q 20/102
                                                  705/14.58

OTHER PUBLICATIONS

M. Depalma, "System, Method or Apparatus for Exchanging Knowledge, Information, Products or Any Entity(ies) of Value, and Real Time Market and//or Individual Sensitive or Responsive System of Education", IPCOM, ip.com, IPCOM000177786D, Jan. 1, 2009, pp. 1-18.

Wolfram Alpha, "Making the World's Knowledge Computable", Wolfram Alpha LLC, www.wolframalpha.com, retrieved Apr. 16, 2014, pp. 1-2.

List of IBM Patents or Patent Applications Treated as Related, Nov. 10, 2014.

* cited by examiner

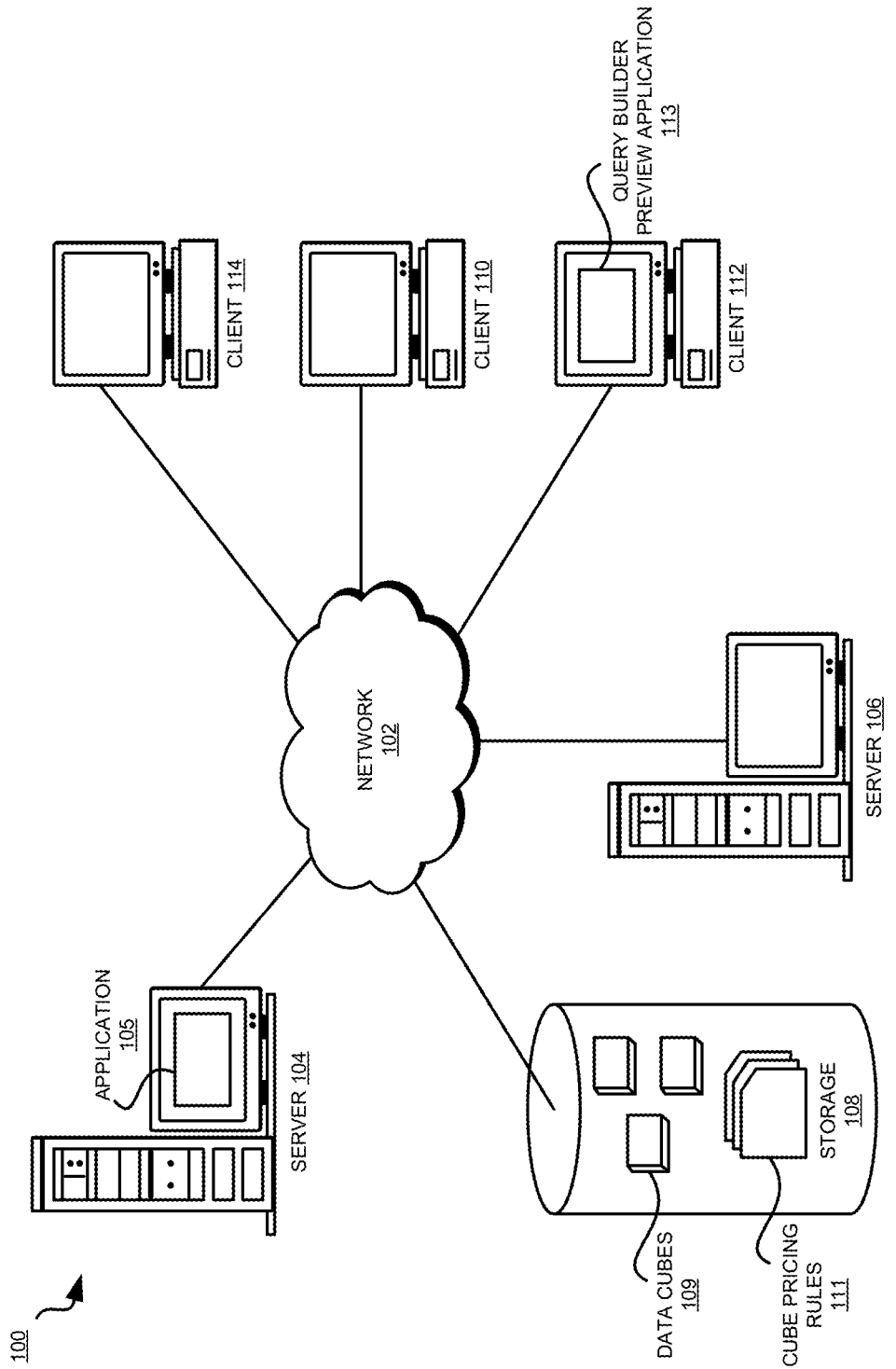

US 10,453,104 B2

PRICING DATA ACCORDING TO CONTRIBUTION IN A QUERY

TECHNICAL FIELD

The present invention relates generally to a method, system, and computer program product for selling quanta of data. More particularly, the present invention relates to a method, system, and computer program product for pricing data according to contribution in a query.

BACKGROUND

A data store is a repository of data. Generally, the data in a data store does not have to conform to any particular form or structure. Typically, data sourced from several different sources of different types is stored in a data store, and the different sources provide their data in varying formats, organized in different ways, and often in unstructured form. Several methods for querying data from one or more data stores are presently in use.

SUMMARY

The illustrative embodiments provide a method, system, and computer program product for pricing data according to contribution in a query. An embodiment includes An embodiment includes a method for pricing data according to contribution. The embodiment identifies a set of data cubes, wherein a data cube in the set of data cubes comprises a quantum of data configured for trading in exchange for a payment, the set of data cubes being usable for answering a query. The embodiment computes a first portion of a price for performing the query, wherein the first portion corresponds to a first number of records used from a first data cube by the query, the first data cube being included in the set of data cubes. The embodiment presents the first portion and the first number of records in a pricing preview of the query.

Another embodiment includes a computer program product for pricing data according to contribution. The embodiment further includes one or more computer-readable tangible storage devices. The embodiment further includes program instructions, stored on at least one of the one or more storage devices, to identify a set of data cubes, wherein a data cube in the set of data cubes comprises a quantum of data configured for trading in exchange for a payment, the set of data cubes being usable for answering a query. The embodiment further includes program instructions, stored on at least one of the one or more storage devices, to compute a first portion of a price for performing the query, wherein the first portion corresponds to a first number of records used from a first data cube by the query, the first data cube being included in the set of data cubes. The embodiment further includes program instructions, stored on at least one of the one or more storage devices, to present the first portion and the first number of records in a pricing preview of the query.

Another embodiment includes a computer system for pricing data according to contribution. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to identify a set of data cubes, wherein a data cube in the set of data cubes comprises a quantum of data configured for trading in exchange for a payment, the set of data cubes being usable for answering a query. The embodiment further includes program instructions, stored on at least one of the one or more storage devices for execution by at least one of the one or more processors via at least one of the one or more memories, to compute a first portion of a price for performing the query, wherein the first portion corresponds to a first number of records used from a first data cube by the query, the first data cube being included in the set of data cubes. The embodiment further includes program instructions, stored on at least one of the one or more storage devices for execution by at least one of the one or more processors via at least one of the one or more memories, to compute a second portion of the price for performing the query, wherein the second portion corresponds to a second number of nodes traversed from a second data cube during an execution of the query, the second data cube being a non-relational data cube included in the set of data cubes. The embodiment further includes program instructions, stored on at least one of the one or more storage devices for execution by at least one of the one or more processors via at least one of the one or more memories, to present the first portion, the second portion, the first number of records, and the second number of nodes in a pricing preview of the query.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 1 depicts a block diagram of a network of data processing systems in which illustrative embodiments may be implemented;

DETAILED DESCRIPTION

Figure 1A:
FIG. 1A depicts an example relational data cube usable for pricing in accordance with an illustrative embodiment.

A data cube is a quantum of data that can be sold, purchased, borrowed, installed, loaded, or otherwise used in a computation. Much like an application store contains applications, a data store according to the illustrative embodiments contains numerous data cubes.

In a manner similar to obtaining an application from an application store for use on a device, the illustrative embodiments contemplate that a user can obtain one or more data cubes to use in the user's query. For example, a user can use a shopping cart application to select data cubes from a data store. The user can then buy, borrow, lease, loan, download, install, or otherwise use the selected data cubes in the user's query in the manner of an embodiment.

Computing resources, such as processor time, memory, and storage space, are often billed according to their use. An amount of billing for a computing resource is usually proportional to an amount of time and the size of the resource used by a user.

The illustrative embodiments recognize that presently data is not sold or traded as data cubes, but in conjunction with some application or environment. For example, map data is sold as a bundle with a navigation application, financial data is sold in conjunction with a financial analysis application, as so on. The illustrative embodiments recognize that selling or trading data by bundling with an application restricts the utility of the data as well as the market for the data. For example, a user who wants to use certain map data must also buy or subscribe to a specific application to use the data.

The illustrative embodiments recognize that data is artificially tied to applications. The illustrative embodiments recognize that much of the data is, or can be, a generalized commodity, which can be traded independently from any trade involving applications or other restrictions.

The illustrative embodiments recognize that making data available for use, such as in a query, has value. The illustrative embodiments further recognize that unlike the billing for computing resources, the amount of data used, e.g., bytes, Megabytes, Gigabytes, or Terabytes delivered, is not an adequate indicator of the value of the data. Similarly, the period of the usage is also not an adequate indicator of the value of the data. Consequently, the illustrative embodiments recognize that the pricing of data cubes has to be use-related, such that the price a user pays for a data cube, or a part thereof, is related to the contribution of that data cube, or a part thereof, in the user's query. Even when generic data is available for purchase today, the pricing of that data is static, regardless of the contribution of the data to different users. Furthermore, where generic data can be purchased, a user has to pay first to purchase the data, in order to be able to determine the data's utility for the user's intended purpose.

The illustrative embodiments used to describe the invention generally address and solve the above-described problems and other problems related to trading in data. The illustrative embodiments provide a method, system, and computer program product for pricing data according to contribution in a query.

An embodiment allows a data source (seller) to define how they want to control the use of the data cube they contribute to a data store. The embodiment further allows the seller to define certain pricing parameters to use when the data cube is selected for participating in a query.

An embodiment receives a query from a user (buyer). The embodiment identifies a set of data cubes that participate in the query. For each data cube in the set, the embodiment further identifies an amount of data used in answering the query. Optionally, an embodiment eliminates, removes, or otherwise disqualifies zero or more data cubes from the set based on any pricing or use restrictions prescribed by the seller.

For example, a seller of a healthcare-related data cube may not wish for the cube to participate in a query where it becomes possible to identify an individual patient. Thus, even though a healthcare-related query can use the data cube, the data cube may be disqualified if the nature of the query or combining the data cube with another data cube in the query can lead to an individual's identification.

As another example, only a portion of a particular data cube may be suitable for participating in a query but the seller of the data cube may prohibit partial use of the data cube. These examples of data cube disqualification are not intended to be limiting on the illustrative embodiments. Specific circumstances can give rise to any number of reasons for disqualification of a data cube, and the same are contemplated within the scope of the illustrative embodiments, with the goal of conforming to all applicable conditions in selecting a suitable set of data cubes for answering a query.

Furthermore, some data cubes may be eliminated from the identified set of data cubes due to a restriction that the buyer places upon the data cube selection. For example, a user can specify that no data cube whose pricing exceeds a certain amount be used in executing the query. Accordingly, even if a data cube is not disqualified due to a seller-imposed restriction, the pricing of the data cube might eliminate the cube from consideration in the query. Again, many other buyer-imposed conditions can limit or expand the set of data cubes that participate in a query, and the same are contemplated within the scope of the illustrative embodiments, with the goal of conforming to all applicable conditions in selecting a suitable set of data cubes for answering a query.

An embodiment further determines a level of contribution of a selected data cube in the query. The level of contribution can be determined without executing the query, upon executing the query, or a combination thereof.

For example, assume a relational cube is represented as table 150 in FIG. 1A. An SQL query designed to use the relational data cube may select all records in a specific column of the cube. For example, an example query may include a statement, "SELECT*FROM DEVICE" where the "DEVICE" is the name of an example column in relational data cube 150. Assuming that example data cube 150 subject to this query has four columns and five rows, the embodiment determines that five records are contributed to the query by example data cube 150.

As another example, a query designed to use a non-relational graph data cube may have to be executed to determine how many nodes (records) from the graph cube are utilized in performing the query.

Assume that an example graph data cube includes a relationship a→b→c→d. This relationship infers a→d but to reach data d, nodes a, b, c, and d have to be traversed. A price for using the graph data cube may account for such inferential relationships, including charges for the hops involved.

Alternatively, the pricing of graph data cubes may use other manner of defining pricing to account for such nuances of using data in a non-relational cube. For example, graph data cubes include a concept of "important" nodes. An important node is a node that has more than a threshold number of incoming relationships, where a relationship is represented as an edge connecting one node to another in the graph. For example, a search engine determines the relative importance of websites based on the number of visits that the website receives. The search engine assigns higher importance to websites that are visited more than a threshold number of times over a period. Higher importance of a website causes the website to bubble up to the top of search results. In case of an embodiment, the more important a node that is used for a query, the higher the price can be for the graph data cube.

Similarly, a relational query may perform a complex join and other operations that make it difficult to compute a number of records participating in the query. Furthermore, more than one data cubes, of more than one type, may participate in a query. In these and many other situations, the level of contribution of a particular data cube may not be apparent without executing the query against that data cube.

For example, an embodiment may find that example query with the select statement also has other statements, which upon execution, have used one million records or cells of data from a relational cube "B", fifty thousand graph nodes and relationship records from a graph cube "C", and two thousand records from data "D" that the user owns or provided. Accordingly, the embodiment determines that cube "B" contributed one million records that are billable, cube "C" contributed fifty thousand records that are billable. The embodiment determines that the user's own data is not billable.

The embodiment computes a pricing for cubes "A", "B", and "C" based on one or more pricing rules or pricing definitions associated with cube "A", "B", and "C", respectively. For example, the embodiment uses a pricing rule of cube "A" to compute a first portion of a total price of the example query by applying the cube "A" pricing rule to the pre-execution estimated number of records contributed by cube "A". Similarly, the embodiment uses a pricing rule of cube "B" to compute a second portion of a total price of the example query by applying the cube "B" pricing rule to the post-execution actual number of records contributed by cube "B". Similarly, the embodiment uses a pricing rule of cube "C" to compute a second portion of a total price of the example query by applying the cube "C" pricing rule to the post-execution actual number of records or nodes contributed by cube "C".

Thus, given a query, an embodiment computes various contribution-related pricing for the specific contributions of each participating data cubes to the query. An embodiment then allows the user a preview of the query pricing, including the pricing break-down by participating data cubes.

Even if the query has actually been executed in the background, the embodiment does not provide the result set to the user, so as to prevent a use of the result set without payment. The preview according to an embodiment is sufficient for the user to determine whether the participating data cubes are in fact suitable for the result expected by the user, whether the pricing of one or more data cubes is acceptable to the user, or a combination thereof.

After the preview, the user can commit to pay for the selected data cubes and proceed to execute the query and obtain the result set. Alternatively, if the user finds a characteristic of the result set, a pricing of the result set, or both, unacceptable, the user can modify the query and repeat the process of an embodiment.

An embodiment provides a preview of a characteristic of the result set without divulging the result set itself. For example, one embodiment provides a size of the result set as one example characteristic of the result set. The user can get some idea of the contents of the result set from the size, depending on whether the size corresponds to an expected size of the result set. For example, if the user expects one hundred records in the result set approximating at least one kilobyte of data, and the preview shows a result set of zero bytes or five bytes, the user may wish to modify the query.

One embodiment can further enhance the pricing model by considering not only a data cube's contribution in the query, but also an amount of data from the data cube that the cube contributes to the result set. For example, even if a cube contributes one million records to a query where each record is fifteen columns wide, the result set may only include ten records, each record being three columns wide, from that data cube.

One embodiment uses a cube's contribution to the query for pricing the data cube for the query. Another embodiment uses a cube's contribution to the result set for pricing the data cube for the query. Another embodiment uses a cube's contribution to the query as well as the result set for pricing the data cube for the query.

An embodiment further uses one or more pricing selection criteria to determine how to price a cube's contribution. For example, when a data cube contributes one million records to the query, and the result set includes just one cell, such as a name of a person, pricing based on contribution to the query may be more justified as compared to pricing based on contribution to the result set.

The illustrative embodiments are described with respect to, data formats, queries, data cubes, example pricing definitions, rules, criteria, result sets, characteristics, previews, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
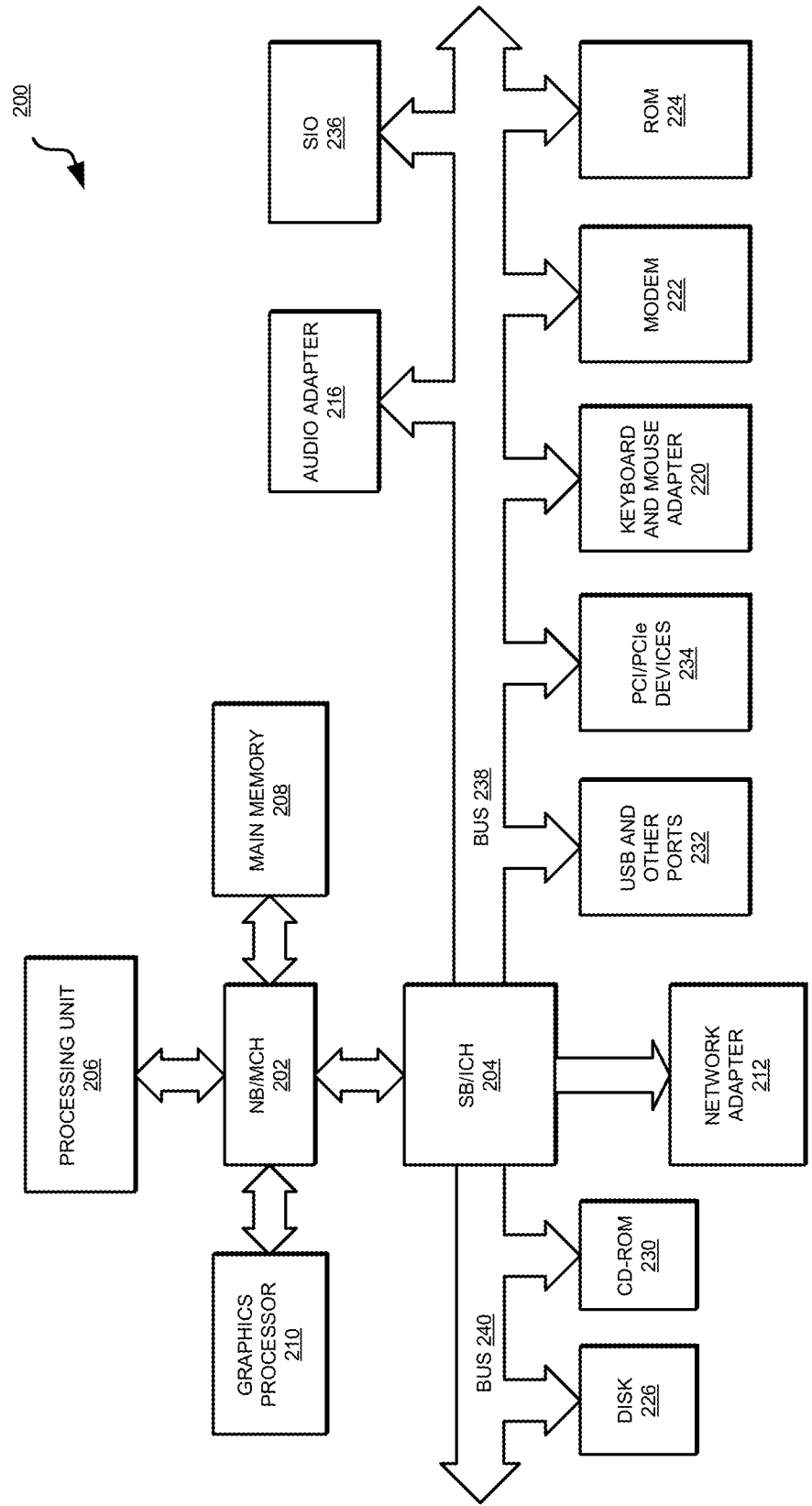
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 105 in server 104 implements an embodiment described herein. Data cubes 109 are cubes located in a data store, such as a data store using storage 108. Cube pricing rules 111 include one or more pricing rules for a data cube in data cubes 109. Application 113 in client 112 is an example application using which a user or buyer can build submit a query to application 105. In one embodiment, application 113 is also usable to preview the query pricing and result set characteristics as described herein. Application 105 selects a set of data cubed from data cubes 109. Application 105 prices the cubes that participate in the query according to a pricing rule in pricing rules 111, as applied to the cube's contribution to the query, the cube's contribution to the result set, or a combination thereof.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

FIG. 1A depicts an example relational data cube usable for pricing in accordance with an illustrative embodiment.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
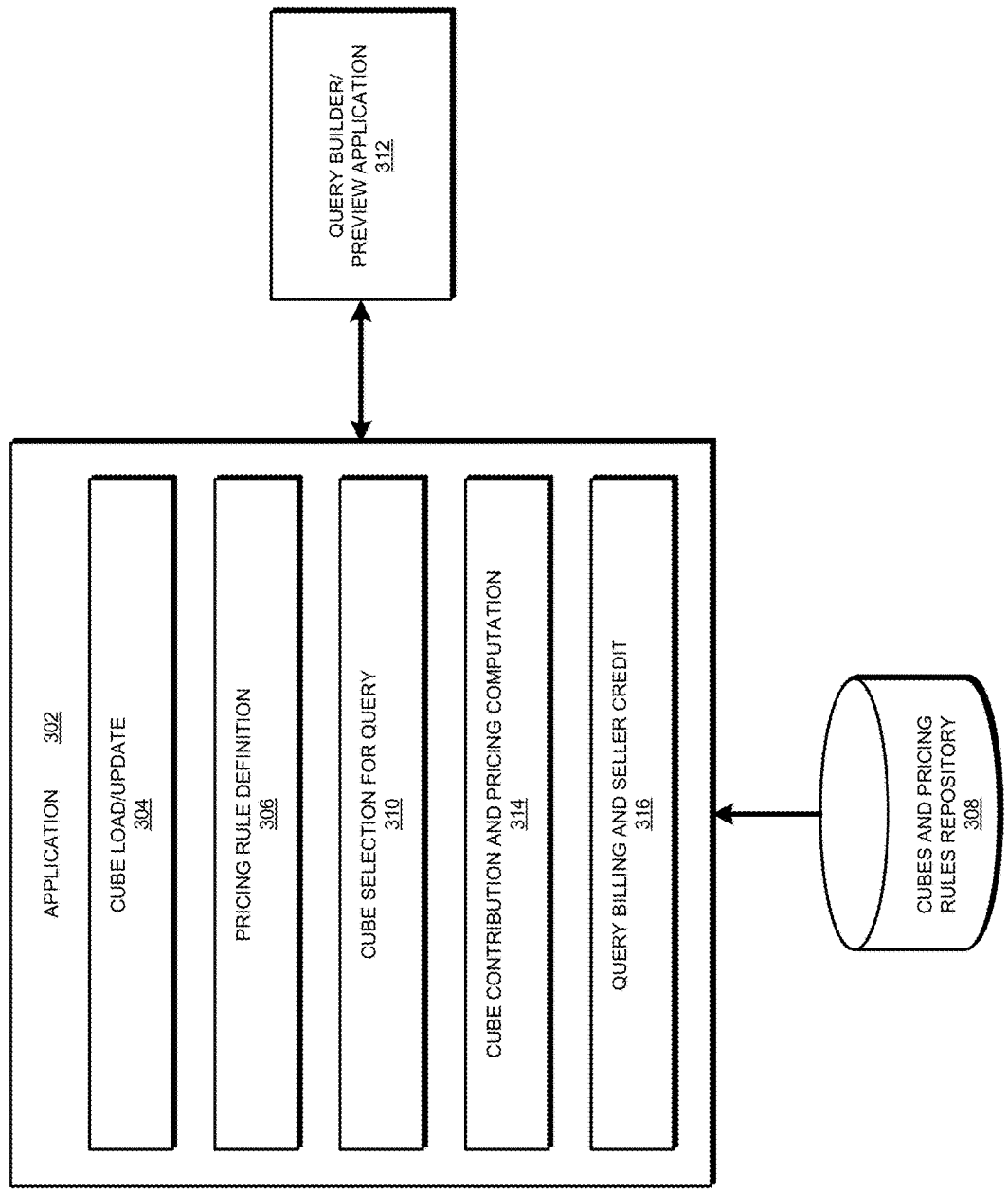
FIG. 3 depicts a block diagram of an application for pricing data according to usage in a query in accordance with an illustrative embodiment.

With reference to FIG. 3, this figure depicts a block diagram of an application for pricing data according to usage in a query in accordance with an illustrative embodiment. Application 302 is an example of application 105 in FIG. 1. The configuration of application 302 depicted in FIG. 3 is only an example to describe the various functions of application 302. From this disclosure, those of ordinary skill in the art will be able to implement similar, additional, or different functions in other configurations as well, and the same are contemplated within the scope of the illustrative embodiments.

Component 304 allows a seller to load a data cube into a data store, update an existing cube in the data store, or both. Component 306 allows the seller to define one or more pricing rules for a data cube that the seller loads or updates. As an example, in one embodiment, component 306 presents an interface described with respect to FIG. 4 to enable the pricing rule configuration for a data cube. The data cube from component 304, and the one or more pricing rules associated with the data cube are stored in repository 308.

Component 310 interacts with query builder application 312 to receive a query. Query builder 312 is an example of application 113 in FIG. 1. Component 310 selects a set of cubes from repository 308. Each cube in the selected set of cubes can potentially participate in the query.

In one embodiment, component 310 further receives a set of user-specified parameters. For example, the user-specified parameters control how the cubes are selected for executing the query, what pricing restrictions are observed in the selection, and several other aspects of building and executing the query to yield a result set.

Component 314 evaluates the contributions of a data cube to the query, the result set, or a combination thereof. When possible, component 314 determines a data cube's contributions without executing the query, or a part thereof. When needed, component 314 executes the query, or a part thereof, to determine the contributions of a data cube.

Component 314 performs contribution-based pricing computation for the combination of cubes as described elsewhere in this disclosure. As an example, in one embodiment, component 314 presents an interface described with respect to FIG. 5 to enable previewing the query pricing, previewing result set characteristics, accepting the selected data cubes for query execution, modifying the query in response to the previewing, or a combination thereof. In one embodiment, the interface is presented using application 312.

Component 316 performs the billing for the data cubes used in executing the query. For example, component 316 bills the user, debits the user's account, credits the accounts associated with the sellers of the used data cubes, or a combination thereof.

Figure 4:
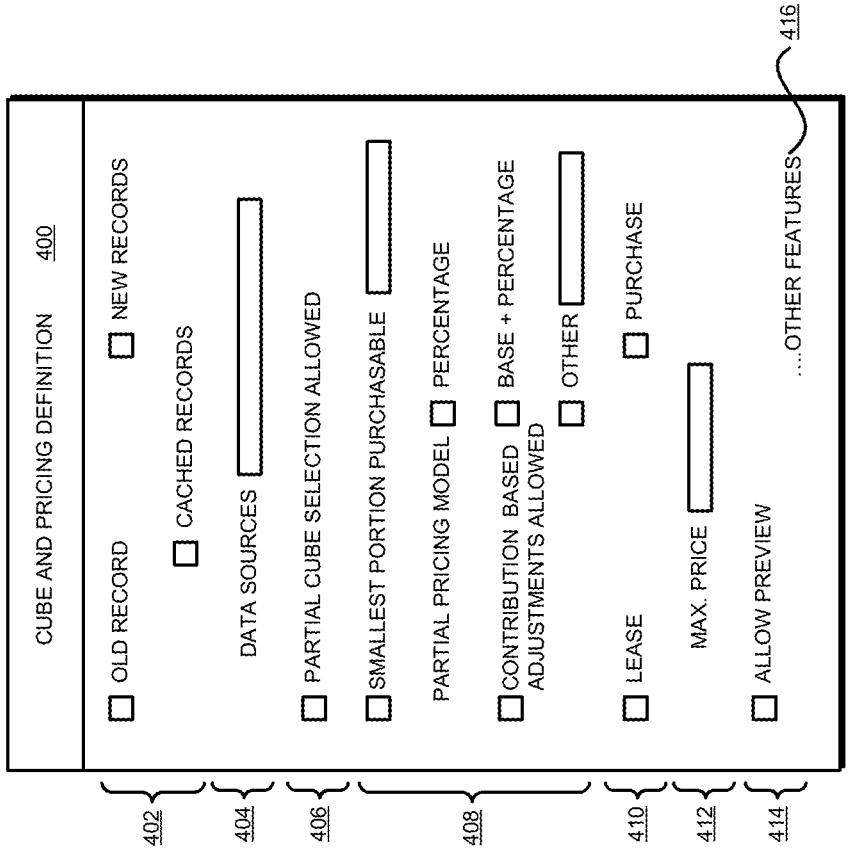
FIG. 4 depicts an example set of sellers' features on an example user interface in accordance with an illustrative embodiment.

With reference to FIG. 4, this figure depicts an example set of sellers' features on an example user interface in accordance with an illustrative embodiment. Interface 400 is presented during the functions of component 304, 306, or both, in FIG. 3. Interface 400, its layout, contents, or types of controls depicted in FIG. 4 are only examples for describing certain features of an embodiment, and are not intended to be limiting on the illustrative embodiments. Other similar features, additional features, or different features will be conceivable from this disclosure and the same are contemplated within the scope of the illustrative embodiments.

In the example depiction, interface 400 provides controls 402 to allow a seller to describe the data cube. For example, using controls 402, a seller specifies whether the cube includes data older than a certain time, data newer than a certain time, data cached from the cube, or a combination thereof. Using controls 402 or additional or different controls (not shown), the seller can also indicate whether the pricing applies to old records in the cube, new records in the cube, cached records of the cube, or a combination thereof.

Control 404 allows the seller to provide information about the source of the data in the data cube. Often, a decision whether to use a certain cube in a query depends, at least in part, on the provenance or other information of the source. As an example, using control 404 or additional or different controls (not shown), the seller can provide the provenance information about the data source.

Using controls 406, the seller can specify whether the seller will allow only parts of the data cube to be selected for participation in a query. Controls 406 further allow the seller to specify the smallest portion of the data cube that can be sold, leased, traded, or otherwise used with payment in a query. For example, if the cube comprises ten columns, the seller can specify that the smallest portion tradable from the cube is a row or more of all columns, some rows of some columns, or an individual cell.

Controls 408 allow the seller to define one or more pricing rules for the data cube. The seller can define a pricing model of any type, for any portion of the data in the cube, and with any level of detail, with the help of depicted controls and other controls. Any number or type of other controls (not shown for simplifying the figure), can be configured in interface 400 to allow the seller to define selection, participation, and pricing for several portions of the data cube at any level of granularity.

The seller can also choose to allow or disallow contribution-based pricing adjustment as described elsewhere in the disclosure. Note that the pricing models depicted in FIG. 4 are only examples to describe a concept, and are not intended to be limiting on the illustrative embodiments.

Controls 410 allow the seller to select the types of trades in which the data cube can participate. For example, some cubes may only be bought, while others may be leased, rented, borrowed, bartered, or otherwise traded for a payment in any suitable manner.

The seller can also specify limits on the pricing of the data cube. For example, controls 412 allow the seller to specify an absolute pricing upper limit for the entire cube, different pricing limits for different trading options, different portions, different types of contributions in queries and result sets, or a combination of these and several other conditions.

As described elsewhere, an embodiment allows a user to preview the potential query price and/or result set characteristics from using a particular cube, before committing to buy or trade for the cube. Control 414 allows a seller to specify whether the cube or a portion thereof can be previewed without purchasing. By allowing a preview of the cube or a portion thereof, a seller can allow the preview interface to show not only a characteristic of the result set but also even parts of the result set that are contributed by the cube.

Additional controls (not shown) can implement additional or different features 416 in interface 400. For example, additional controls can restrict particular usage of the cube. Many variations of these features, additional details in the depicted example features, additional features, and different features for a similar purpose of offering a seller control over the pricing and usage of their data cubes will be apparent from this disclosure. The same are contemplated within the scope of the illustrative embodiments.

Figure 5:
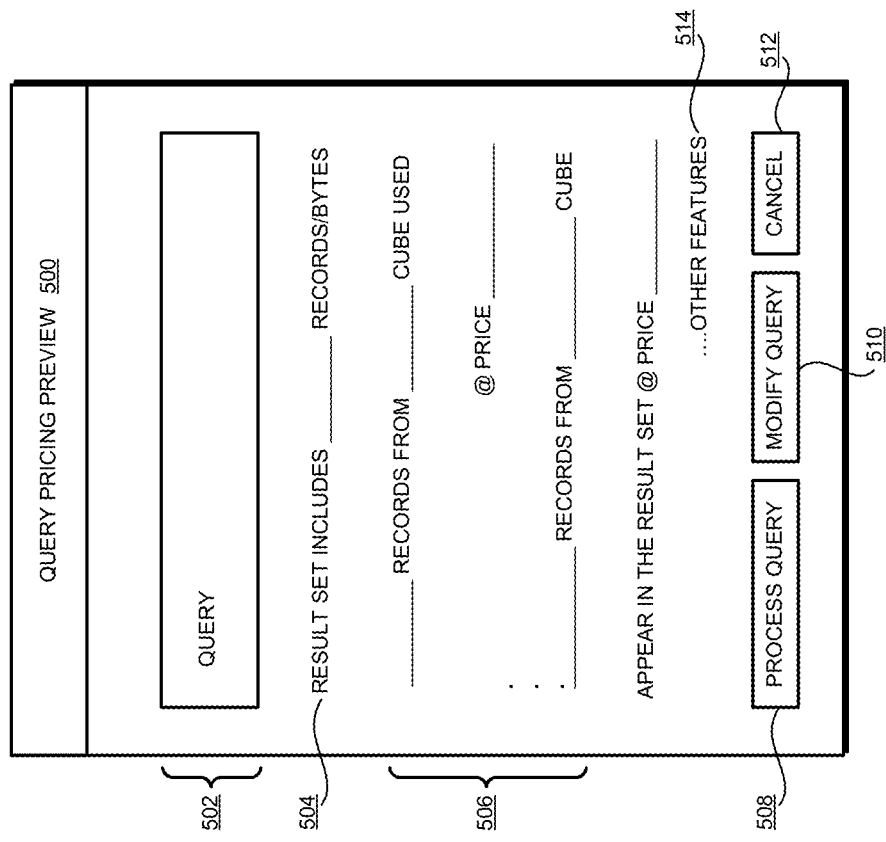
FIG. 5 depicts an example set of preview features on an example user interface in accordance with an illustrative embodiment.

With reference to FIG. 5, this figure depicts an example set of preview features on an example user interface in accordance with an illustrative embodiment. Interface 500 is presented during the functions of component 314 in FIG. 3. Interface 500, its layout, contents, or types of controls depicted in FIG. 5 are only examples for describing certain features of an embodiment, and are not intended to be limiting on the illustrative embodiments. Other similar features, additional features, or different features will be conceivable from this disclosure and the same are contemplated within the scope of the illustrative embodiments.

In the example depiction, interface 500 provides control 502 to allow a user to view or edit the query. For example, using control 502, a user edits a query or a pseudo query in a manner sufficient to identify or change one or more data cubes that can participate to generate a desired result set.

Control 504 allows the user to preview one or more characteristics of the result set obtained from the query. In the depicted example, control 504 informs the user about a number of records in the result set, size of the result set, or a combination of these and other characteristics. Additional or different controls can be used as control 504 to preview parts of the actual result set or other characteristics of the result set.

Controls 506 provide the contribution-based pricing information about one or more data cubes that participate in the query. For example, one control in controls 506 informs the user about a number of records contributed to the query by a data cube, and the pricing for such contribution computed according to a pricing rule. As another example, another control in controls 506 informs the user about a number of records contributed to the result set by a data cube, and the pricing for such contribution computed according to a pricing rule. Additional or different controls are usable in addition to or in place of controls 504 and 506 to preview similar information, and the same are contemplated within the scope of the illustrative embodiments.

Control 508 is usable to indicate that the user is satisfied with the preview and the application, such as application 302 in FIG. 3, may proceed to execute the query using the set of cubes used in the preview. Control 510 is usable to indicate that the user is not satisfied with the preview and wishes to modify the query. The application, such as application 302 in FIG. 3, can then evaluate the contributions of a revised set of data cubes towards the modified query in a similar manner and present a revised preview. Control 512 allows the user to abandon the query and exit the preview without committing to buying or trading any data cube.

Additional controls (not shown) can implement additional or different features 514 in interface 500. Many variations of the depicted example features, additional details in the depicted example features, additional features, and different features for a similar purpose of offering a user control over the contributions of data cubes and price the user pays for such contributions will be apparent from this disclosure. The same are contemplated within the scope of the illustrative embodiments.

None of the features described in FIGS. 4 and 5 are necessary for the operation an embodiment. For example, an embodiment can use defined values from profiles, default values in an environment, machine learning based learned preferences, and other ways for configuring similar features, and the same are contemplated within the scope of the illustrative embodiments.

Figure 6:
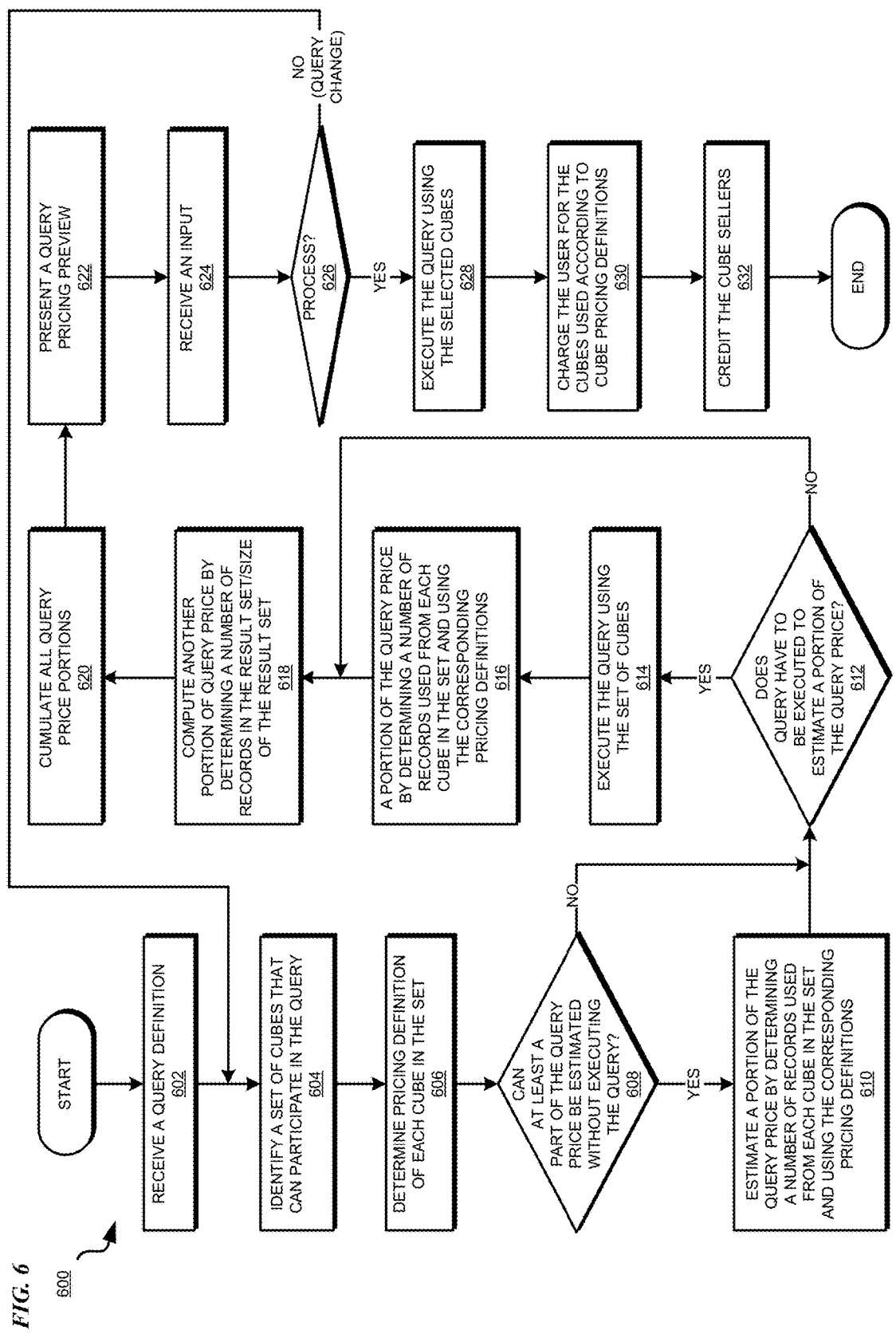
FIG. 6 depicts a flowchart of an example process for contribution-related pricing of data in accordance with an illustrative embodiment.

With reference to FIG. 6, this figure depicts a flowchart of an example process for contribution-related pricing of data in accordance with an illustrative embodiment. Process 600 can be implemented in application 302 in FIG. 3.

The application receives a query definition (block 602). The application identifies a set of data cubes that can participate in the query (block 604). The application determines one or more pricing definitions or rules applicable to each data cube in the identified set of cubes (block 606).

The application determines whether at least a part of the query price can be estimated without executing the query (block 608). If so ("Yes" path of block 608), the application estimates a portion of the query price by determining a number of records used from each cube in the set and using their corresponding pricing definitions (block 610). If not ("No" path of block 608), the application proceeds to block 612.

The application determines whether the query has to be executed to estimate a portion of the query price (block 612). If so ("Yes" path of block 612), the application executes the query using the set of cubes (block 614). The application determines a portion of the query price by determining a number of records used from each cube in the set and using one or more of the corresponding pricing definitions (block 616). If not ("No" path of block 612), the application proceeds to block 618.

The application computes another portion of the query price by determining a number of records in the result set, a size of the actual or expected result set, as the case may be, (block 618). In one embodiment, the portion computed in block 618 comprises the absolute number or size of the result set. In another embodiment, the portion computed in block 618 comprises the number or size of records contributed by a particular data cube to the result set, and the application repeats block 618 to determine similar portions for all contributing data cubes.

The application cumulates all query price portions computed thus far in process 600 (block 620). The application presents the query pricing for preview (block 622). In one embodiment, the application presents the portions corresponding to separate data cube contributions separately. In another embodiment, the application further presents one or more characteristics of the result set in block 622 as well. In another embodiment, the application further presents a part of the result set in block 622 as well.

The application receives an input (block 624). The application determines whether the input is to process the query using the set of cubes (block 626). If the input is to not process the query, such as when the input comprises a change or modification to the query ("No" path of block 626), the application returns process 600 to block 604. If the input is to process the query ("Yes" path of block 626), the application executes the query using the selected set of cubes (block 628). If the query or a part thereof has already been executed in block 614, an embodiment can entirely or partially omit block 628 and thereafter proceed to block 630.

The application charges the user for the used cubes according to the cube pricing definitions of those cubes (block 630). The application credits the sellers of the used cubes according to the usage (block 632). The application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for pricing data according to contribution in a query.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for pricing data according to contribution, the method comprising:
    receiving, by a server, a query from a client;
    identifying, by a processor, a set of data cubes, wherein a data cube in the set of data cubes comprises a quantum of data configured for trading in exchange for a payment, the set of data cubes being usable for answering the query, the payment proportional to a level of contribution of the data cube relative to a level of contribution of the set of data cubes to answering the query;
    evaluating whether a first portion of a price for performing the query can be estimated without executing the query;
    computing, by the processor, responsive to the evaluating of the first portion being affirmative, an estimation of the first portion of the price for performing the query without executing the query, wherein the first portion corresponds to a first number of records used from a first data cube by the query, the first data cube being included in the set of data cubes, wherein the estimation of the first portion is computed by applying a first pricing rule associated with the first data cube to the first number of records used from the first data cube by the query and applying a second pricing rule associated with the first data cube to a second number of records from the first data cube contributed to a result set resulting from executing the query;
    evaluating whether a second portion of a price for performing the query can be estimated without executing the query;
    computing, responsive to the evaluating of the second portion being negative, the second portion of the price for performing the query after executing the query, wherein the second portion corresponds to a second number of nodes traversed from a second data cube during an execution of the query, the second data cube being a non-relational data cube included in the set of data cubes;
    presenting, by the processor, the first portion, the first number of records, and the second portion in a pricing preview of the query;
    receiving an input, the input indicating whether to execute the query using the set of data cubes;
    presenting, responsive to the input allowing execution of the query using the set of data cubes, the result set resulting from executing the query using the set of data cubes, wherein the result set includes a set of portions, the set of portions indicating which data cube of the set of cubes contributed to the portion; and
    debiting an account for the first portion and the second portion, wherein the second portion is computed using a third pricing rule associated with the second data cube, wherein the third pricing rule corresponds to determining whether a node in the second portion includes more than a threshold number of incoming relationships, wherein a relationship corresponds to an edge connecting the node to other nodes traversed from the second data cube.

2. The method of claim 1, further comprising:
    presenting, in the pricing preview, a characteristic of the result set of the query.

3. The method of claim 2, wherein the characteristic comprises an importance level of a graph node present in the result set.

4. The method of claim 2, wherein the characteristic comprises a number of nodes traversed to include a graph node present in the result set.

5. The method of claim 1, further comprising:
    presenting, in the pricing preview, a characteristic of the result set of the query.

6. The method of claim 5, wherein the characteristic comprises a number of records present in the result set.

7. The method of claim 5, wherein the characteristic comprises a number of bytes present in the result set.

8. The method of claim 1, further comprising:
    presenting, in the pricing preview, a portion of the result set of the query, wherein the portion of the result set is less than the result set.

9. The method of claim 1, wherein the first portion is computed without executing the query.

10. The method of claim 1, wherein the first number of records used from the first data cube comprises a number of columns used from the first data cube.

11. The method of claim 1, wherein the first number of records used from the first data cube comprises a number of rows used from the first data cube.

12. A computer program product for pricing data according to contribution, the computer program product comprising:

one or more computer-readable tangible storage devices;

program instructions, stored on at least one of the one or more storage devices, to receive, by a server, a query from a client;

program instructions, stored on at least one of the one or more storage devices, to identify a set of data cubes, wherein a data cube in the set of data cubes comprises a quantum of data configured for trading in exchange for a payment, the set of data cubes being usable for answering the query, the payment proportional to a level of contribution of the data cube relative to a level of contribution of the set of data cubes to answering the query;

program instructions, stored on at least one of the one or more storage devices, to evaluate whether a first portion of a price for performing the query can be estimated without executing the query;

program instructions, stored on at least one of the one or more storage devices, to compute, responsive to the evaluating of the first portion being affirmative, an estimation of the first portion of the price for performing the query without executing the query, wherein the first portion corresponds to a first number of records used from a first data cube by the query, the first data cube being included in the set of data cubes, wherein the estimation of the first portion is computed by applying a first pricing rule associated with the first data cube to the first number of records used from the first data cube by the query and applying a second pricing rule associated with the first data cube to a second number of records from the first data cube contributed to a result set resulting from executing the query;

program instructions, stored on at least one of the one or more storage devices, to evaluate whether a second portion of a price for performing the query can be estimated without executing the query;

program instructions, stored on at least one of the one or more storage devices, to compute, responsive to the evaluating of the second portion being negative, the second portion of the price for performing the query after executing the query, wherein the second portion corresponds to a second number of nodes traversed from a second data cube during an execution of the query, the second data cube being a non-relational data cube included in the set of data cubes;

program instructions, stored on at least one of the one or more storage devices, to present the first portion, the first number of records, and the second portion in a pricing preview of the query;

program instructions, stored on at least one of the one or more storage devices, to receive an input;

program instructions, stored on at least one of the one or more storage devices, to present, responsive to the input allowing execution of the query using the set of data cubes, the result set resulting from executing the query using the set of data cubes, wherein the result set includes a set of portions, the set of portions indicating which data cube of the set of cubes contributed to the portion; and program instructions, stored on at least one of the one or more storage devices, to debit an account for the first portion and the second portion, wherein the second portion is computed using a third pricing rule associated with the second data cube, wherein the third pricing rule corresponds to determining whether a node in the second portion includes more than a threshold number of incoming relationships, wherein a relationship corresponds to an edge connecting the node to other nodes traversed from the second data cube.

13. The computer program product of claim 12, further comprising:

program instructions, stored on at least one of the one or more storage devices, to present, in the pricing preview, a characteristic of the result set of the query.

14. The computer program product of claim 13, wherein the characteristic comprises an importance level of a graph node present in the result set.

15. A method comprising:

computing a computational cost of a query, wherein the computational cost comprises a first portion and a second portion;

estimating the first portion without executing the query, wherein the first portion is proportional to an amount of data estimated to participate when the query is executed, the data being from a source;

executing the query to obtain a result set;

computing the second portion after executing the query, wherein the second portion is based on an actual amount of data from the source being present in the result set;

constructing, responsive to executing the query, a cost preview of the query, the cost preview comprising the first portion and the second portion.

* * * * *